Oct. 21, 1969 E. G. SEVILLA 3,474,432

TRANSDUCER POSITION DETECTOR

Filed April 27, 1966 2 Sheets-Sheet 1

INVENTOR
ERNESTO G. SEVILLA

BY Edward M. Farrell

ATTORNEY

10% SPEED UP

5% SLOW DOWN

United States Patent Office 3,474,432

Patented Oct. 21, 1969

3,474,432

TRANSDUCER POSITION DETECTOR

Ernesto G. Sevilla, Norristown, Pa., assignor to Sperry Rand Corporation, New York, N.Y., a corporation of Delaware Filed Apr. 27, 1966, Ser. No. 545,632
Int. Cl. G11b *5/00*
U.S. Cl. 340—174.1 5 Claims

ABSTRACT OF THE DISCLOSURE

A magnetic head positioning system which is an improvement over the system of U.S. Patent 3,263,031 is described. The improved system includes a pair of tracks having signals of two different frequencies along with a third track having a reference signal recorded on a record medium. The reference signal is frequency centered between the two track frequencies. A movable transducer is adapted to be disposed between the two tracks and to sense the signals from the tracks. A fixed transducer senses the third track. The reference signal is frequency mixed with the signals from the pair of tracks to produce a resultant signal which is then applied to a detector to generate an error signal which may in turn be used to accurately position the movable transducer between the pair of tracks.

This invention relates to positioning systems, and more particularly to systems for positioning a transducer over a selected track of a record medium.

It is well known that record mediums, such as magnetic drums or discs, record a very large number of information tracks within a very small area. For example, in some cases as many as one thousand tracks per inch may be recorded.

In order to read out information from a selected track, the read head must be precisely positioned over the selected track. Numerous ways of positioning such a head over the selected track have been used. One such method has involved the use of recording a pair of "homing" tracks on the record medium with the signals recorded on the pair of tracks being of different frequencies. The use of two different frequencies provide a convenient means for determining the direction of misalignment of the head.

In the last mentioned system, tranducers are disposed adjacent the two tracks to read the signals recorded thereon. After the signals are read, they are applied to various detector circuits through two separate signal paths or channels generally requiring separate filter networks for the signals of different frequencies. If the transducer is not precisely centered over the two tracks, the resulting output signal from one of the tracks will produce a higher signal at the detector circuit. This indicates that the transducer is not properly centered and a servo mechanism may be employed to move the transducers until the two signals produced by the homing tracks are equal. The use of two separate heads and signal paths for detecting signals from two different tracks generally introduce unbalance and error into the system.

One of the problems encountered in the system utilized is that variations in speed of the record medium tend to produce output error signals which are not representative of the position of the head. This is because the variation in speed of the record medium will cause both frequencies on the homing track to shift. When the signals are applied to a ratio detector circuit, the shifts with respect to the center frequency of the detector will be different for both signals.

In accordance with the present invention, means for correcting error positioning signals resulting from speed variation in a record medium is provided. A pair of tracks having signals of two different frequencies along with a third track having a reference signal are recorded on the record medium. The reference signal is of a frequence centered between the frequencies of the signals recorded on the pair of tracks. A single movable transducer is disposed between the pair of tracks to read signals therefrom and a fixed transducer is disposed to read the reference signal from the third track. The reference signal is mixed with the output signal from an oscillator having a fixed frequency. The mixed signal is then combined with the signals read from the pair of tracks. A detector circuit, tuned to the same frequency as the oscillator, receives the combined signals and produces an output signal free from any error signals resulting from variations in speed of the record medium.

Other advantages of the present invention will be apparent to those skilled in the art, from a reading of the following specification and claims, in conjunction with the accompanying drawings, in which:

Figure 1:
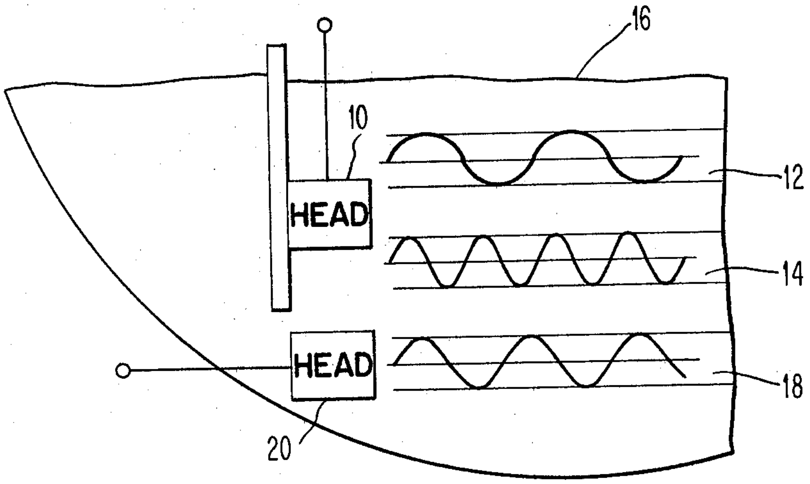
FIGURE 1 illustrates a portion of a record medium along with elements for reading signals therefrom, in accordance with the present invention.

Referring to the drawing, a single transducer 10 is disposed between a pair of homing tracks 12 and 14 on a record medium 16. The transducer 10 is adapted to be moved between the two tracks 12 and 14. A center position will be indicated when the transducer 10 is precisely centered between the two tracks. The transducer 10 may be the transducer which also reads and writes information on the record medium 16 or may be mechanically attached to other transducers disposed to read or write information onto or from other information tracks on the record medium. For example, the tracks 12 and 14 may bear a predetermined special relationship with other information tracks on the record medium so that the movement of the transducer 10 to the correct position will automatically bring other transducers reading or writing information from the information track to the correct positions. Because the present invention only relates to the positioning arrangement, various details relating to other features in a normal information storage system are omitted for purposes of clarity.

A third track 18 includes a reference signal recorded thereon. A fixed transducer 20 is disposed to read the signal recorded on the track 18.

Figure 2:
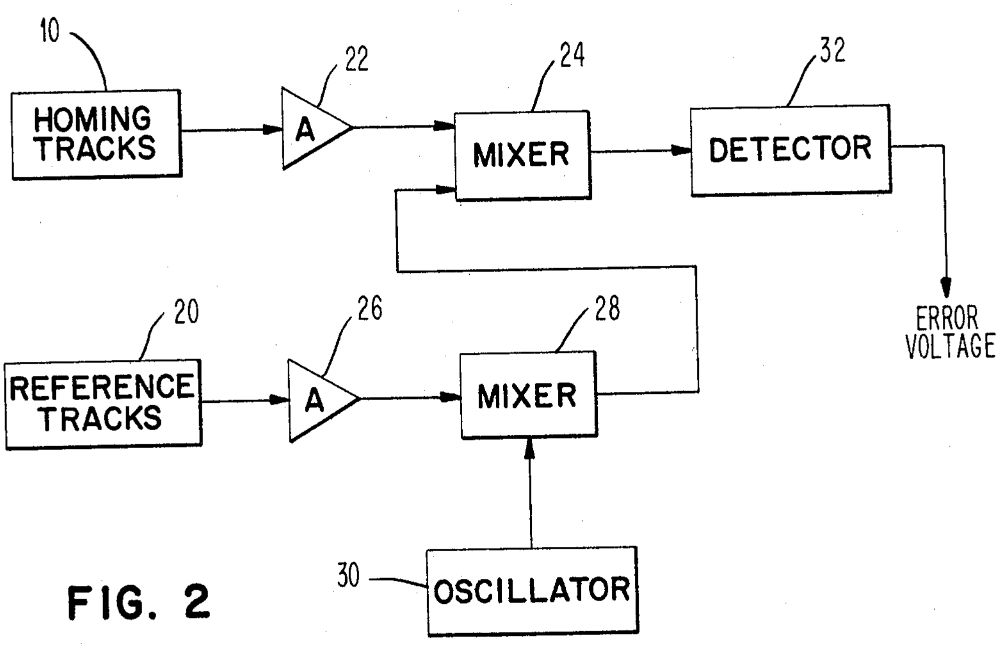
FIG. 2 is a block diagram illustrating one embodiment of the present invention.

Referring particularly to FIGURE 2, output signals from the transducer 10, including the signals read from tracks 12 and 14 is applied through an amplifier 22 to a mixer circuit 24. As will be seen, the mixer circuit 24 is adapted to receive other signals.

The output signal from the transducer 20, representing the reference signal read from track 18, is applied through an amplifier to a second mixer circuit 28. An output signal having a relatively fixed frequency is also applied to the mixer circuit 28 from a fixed frequency oscillator 30.

The ouput signal from the mixer 28, which may have a frequency corresponding to the sum of the reference signal from the track 18 and the frequency from the oscillator 30, is applied to the mixer circuit 24. The mixer circuit 24 may therefore be considered as receiving a combined or sum signal from the mixer circuit 28 and the two signals from the homing tracks 14 and 16.

The output signal from the mixer circuit 24 is applied to a detector circuit 32. This detector circuit may be of a well known type, such as a ratio detector. The ratio detector circuit is designed to be responsive to frequency variations as well as amplitude variations. In the system described, the frequency variations are a result of variations in speed of the record medium and create error signals which should be eliminated. On the other hand, the variations in amplitudes represent a misalignment of the transducer 10. This error voltage may be used in a well known manner, for example in a servo system, to move the transducer 10 until it is centered between the homing tracks.

Figures 3A, 3B, 3C:
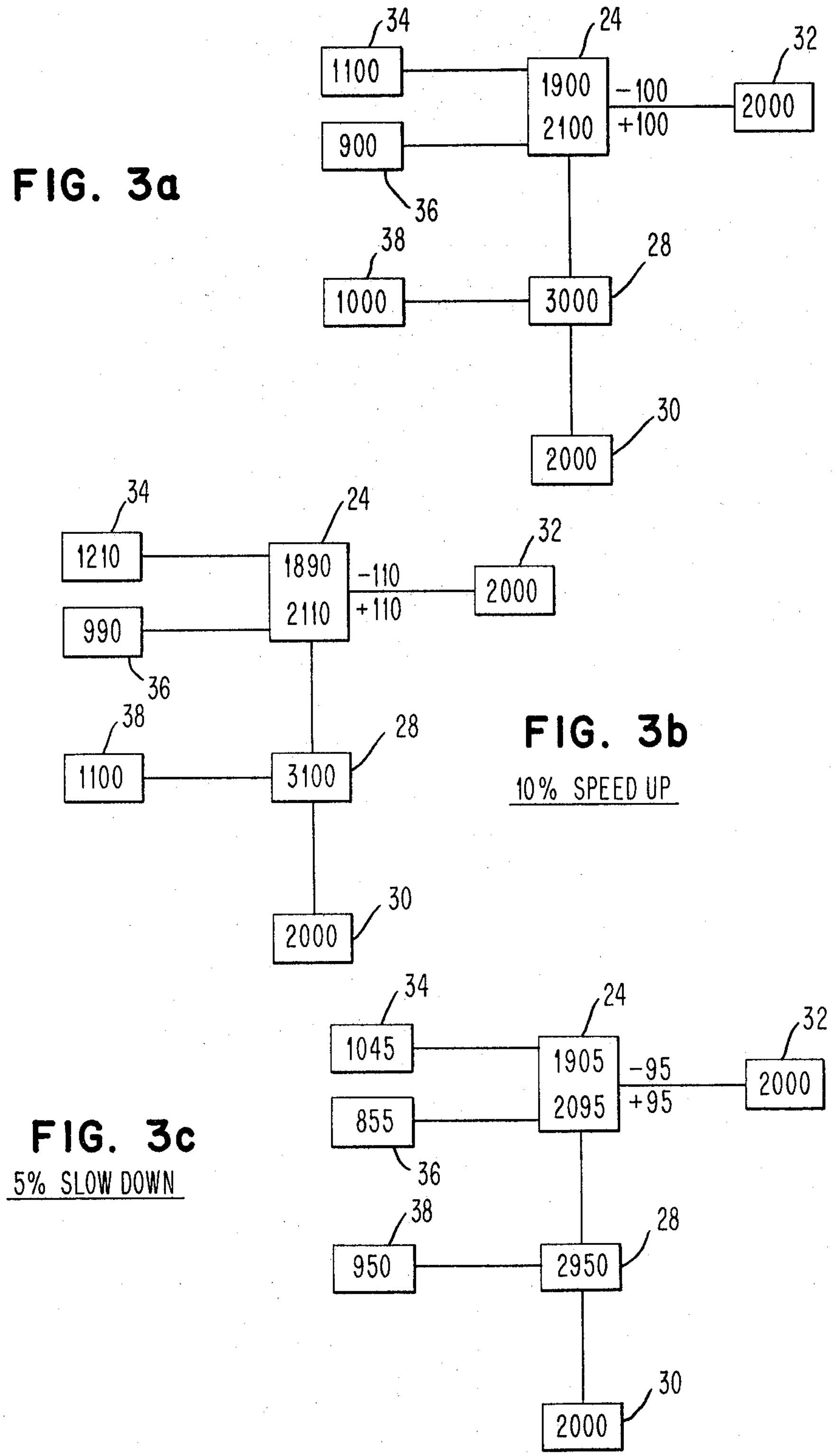
FIGURES 3A, 3B and 3C are block digrams shown for purposes of describing the present invention.

FIGURES 3A, 3B and 3C are shown for purposes of describing the various operating conditions which may take place in a typical system involving the use of the present invention. First consider a condition in which the record medium is being moved at its normal speed.

Under these conditions, the track 12 produces a signal having a frequency of 1100 cycles, for example, represented by a block 34. The signal from the track 14 may have a frequency of 900 cycles, for example, represented by a block 36. As illustrated, the output signals from the blocks 34 and 36 are applied to the mixer circuit 24.

The output signals from the track 18 may have a frequency of 1000 cycles represented by the block 38. The output signal from the block 38 is applied to the mixer circuit 28. The oscillator 30 may generate a fixed frequency of 2000 cycles. The sum of the signals from the block 38 and the oscillator 30 may be 3000 cycles, which is the signal generated in the mixer circuit 28.

The mixer circuit 24 includes signals from the blocks 34, 36 and the mixer circuit 28. The mixer circuit 24 develops a pair of signals representing the difference between the signals from the blocks 34 and 36 and the mixer circuit 28. For example, 1100 cycles subtracted from 3000 cycles produces a frequency of 1900 cycles. Likewise, a frequency of 900 cycles subtracted from 3000 cycles will produce a frequency of 2100 cycles. It is known that heterodyning of signals of different frequencies will produce various types of signals of a number of different frequencies. However, the frequencies mentioned are the ones involved in the present invention and these may be extracted by various filter networks or other means well known to those skilled in the field.

The output signals from the mixer circuit 24, including signals with the frequency 1900 cycles and 2100 cycles, are applied to the ratio detector 32. The ratio detector is tuned to a frequency of 2000 cycles. It is noted that the 2000 cycles is the center frequency between the 1900 cycles and the 2100 cycles. With the 1900 cycles and 2100 cycles being equally spaced between 2000 cycles signal, equal and opposite voltage signals will be developed thereby cancelling each other. Thus it is seen that the frequencies involved do not cause any error signals to be produced. However, if the amplitude of one of the signals from the tracks 12 or 14 is different, an error signal will be produced. Since this feature is well known, details relating thereto are not presented.

Next consider a situation wherein the speed of the recording medium increases 10%. In this case, it is assumed that the frequency read from the various tracks will also increase 10%. Thus, the signal in the block 34 will increase from 1100 cycles to 1210 cycles. In like manner, the frequency in the block 36 will increase from 900 cycles to 990 cycles. Also, the frequency in the block 38 will increase from 1000 cycles to 1100 cycles. When the 2000 cycle is summed with the signal of 1100 cycles, a signal having a frequency of 3100 cycles is produced in the mixer 28.

When the signal frequency of 1210 cycles is subtracted from the 3100 cycles signal, a signal of a frequency of 1890 cycles is produced in the mixer 24. In like manner when the 990 cycle signal is subtracted from the 3100 cycle signal a signal having a frequency of 2110 is produced in the mixer circuit 24.

The output signals from the mixer circuit 24 are again applied to the detector circuit 32, which remains tuned to 2000 cycles. It is noted that the 1890 cycle signal is 110 cycles less than 2000 cycles and the 2110 cycle is 110 more than 2000 cycles. Thus it is seen that the signals from the mixer 24 remains equally distant from the center frequency of 2000. Consequently, the detector 32 will not produce any output signal as a result of the change in frequency from the tracks on the record medium.

Now consider a situation in which the record medium slows down 5%. In this case the frequency in the block 34 will be 1045 cycles; the frequency in the block 36 will be 855 cycles, and the frequency in the block 38 will be 950 cycles. Again the oscillator 30 generates its fixed frequency of 2000 cycles when the 950 cycle signal is mixed with the oscillator frequency and a signal of 2950 cycles will be produced in the mixer circuit 28.

When the 1045 cycle signal from the block 34 is subtracted from the 2950 cycle signal, a signal having a frequency of 1905 cycles will be produced in the mixer circuit 24. Likewise, when the 855 cycle signal is subtracted from the 2950 cycle signal, a signal having a frequency of 2095 cycles is produced in the mixer circuit 24.

The detector circuit 32 remains tuned at 2000 cycles. It is thus seen that the 1905 cycle signal is 95 cycles less than the 2000 cycle signal. The 2095 cycle signal is 95 cycles more than the 2000 cycle signal. Thus it is again seen that despite the variations in frequency of the signals read from the tracks on the record medium that the deviation in the output signals with respect to the center frequency of the detector remains substantially the same. It is therefore seen that regardless of whether the record medium speeds up or slows down to produce different output frequencies, the resulting frequency deviations will still be equally distant from the center frequency to which the detector 32 is tuned.

It is noted that the oscillator 30 is tuned to the same frequency as the detector circuit 32. This provides a relatively simple means for calibrating the tuned circuit of the detector 32.

As mentioned, the detector circuit 32, which may be a circuit which will discriminate for both frequency and amplitude variations, respond to amplitude variations to indicate misalignment of the transducer between the homing tracks. Thus, if the head 10 moves closer to one of the tracks 12 or 14, one of the tracks will produce a greater amplitude signal. This variation in amplitude may be used to move the head to the center position between the two homing tracks. It is noted that the ratio detector circuit 32 must be of the type that the input signals will not be limited so as to permit it to respond to amplitude variations as well as frequency variations.

The embodiments of the invention in which an exclusive property or privilege is claimed are defined as follows:

1. In a system for aligning a movable transducer over an information track recorded on a movable record medium and wherein said system includes a servo-mechanism for moving the transducer, the combination comprising, a pair of signal positioning tracks one on each side of said information track, one of said pair of tracks having a relatively high frequency signal recorded thereon and the other of said pair of tracks having a relatively low frequency signal recorded thereon, said pair of tracks being disposed relative to said information track such that when said movable transducer is centered over said information track said transducer will simultaneously sense the signals recorded on said pair of tracks, a reference frequency signal track recorded on said record medium, said reference signal being frequency centered relative to the frequency of the signals recorded on said pair of tracks, a fixed transducer disposed over said reference frequency signal track to sense the signal recorded thereon, a fixed frequency signal source, a first mixer for frequency summing the signal obtained from the fixed transducer and said fixed frequency source to produce a first resultant signal, a second mixer for frequency differencing the signals obtained from the movable transducer and the first resultant signal to produce a second resultant signal, and a detector circuit for detecting amplitude variations in said second resultant signal and for developing an error signal to control the servo-mechanism of the system.

2. The invention as set forth in claim 1 wherein said detector circuit is tuned to substantially the same frequency as said fixed frequency source.

3. The invention as set forth in claim 2 wherein the positioning signals read from record medium are transmitted to said detector circuit through a single signal path from said movable transducer.

4. The invention as set forth in claim 3 wherein said detector circuit is responsive to variations in amplitude and frequency of signals applied thereto.

5. The invention as set forth in claim 4 wherein variations in speed of said record medium cause the frequencies of said positioning signals to vary with the amount of variations being equal with respect to the tuned frequency of said detector circuit.

References Cited

UNITED STATES PATENTS

| | | | |
|---|---|---|---|
| 2,960,568 | 11/1960 | Leyton | 179—100.2 |
| 2,963,555 | 12/1960 | Brubaker | 179—100.2 |
| 3,041,415 | 6/1962 | Gratian | 179—100.2 |
| 3,263,031 | 7/1966 | Welsh | 179—100.2 |
| 3,337,693 | 8/1967 | Silverstein | 179—100.2 |
| 3,339,192 | 8/1967 | Zeller et al. | 179—100.2 |
| 3,387,295 | 6/1968 | De Mos | 179—100.2 |

BERNARD KONICK, Primary Examiner

V. P. CANNEY, Assistant Examiner

U.S. Cl. X.R.

179—100.2